Feb. 21, 1967  H. M. TORRES  3,304,601
APPARATUS FOR PULLING RETAINERS OR SEALS AND THE LIKE
Filed Aug. 9, 1965
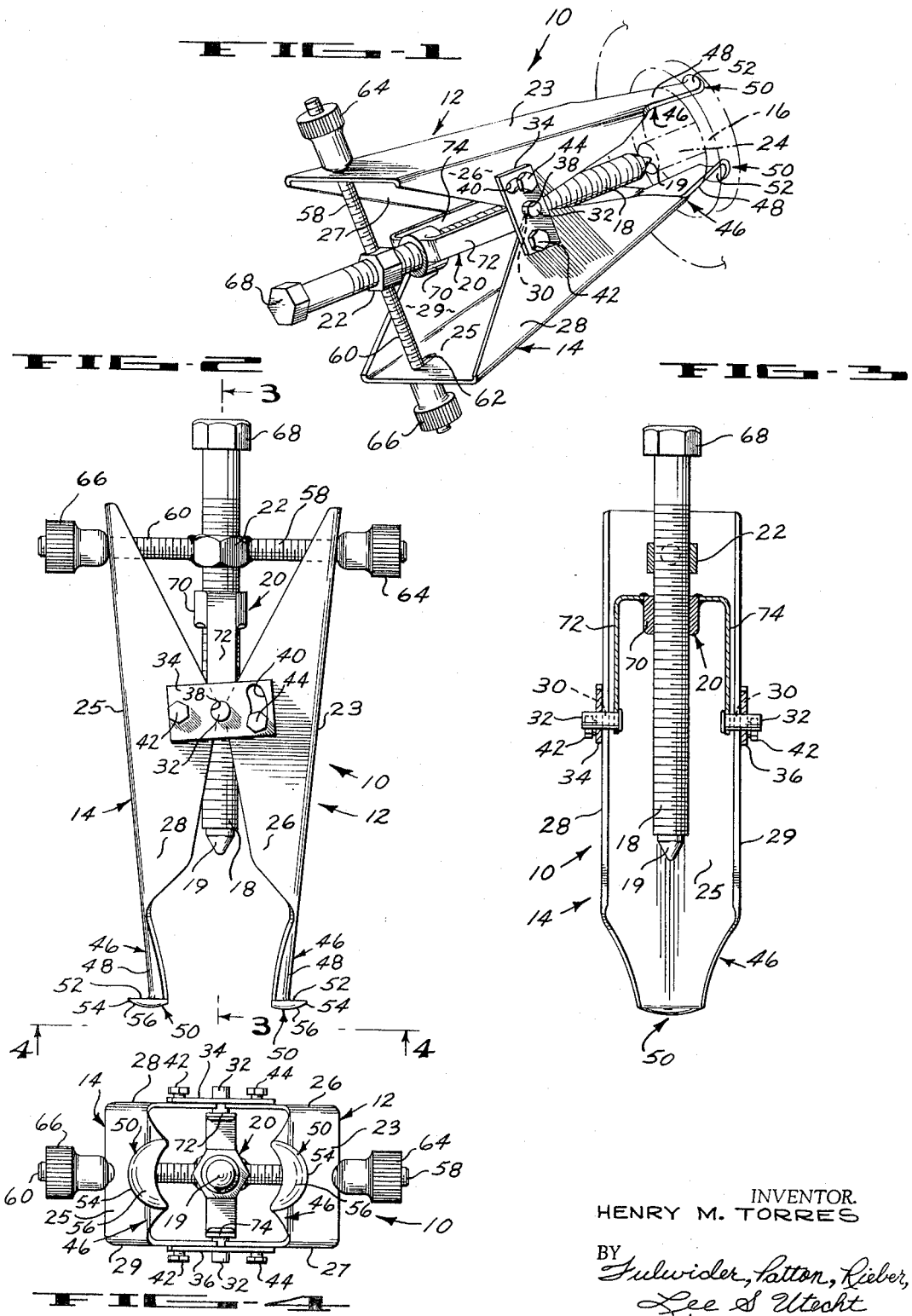
INVENTOR.
HENRY M. TORRES
BY Fulwider, Patton, Rieber,
Lee & Utecht
ATTORNEYS

United States Patent Office 3,304,601
Patented Feb. 21, 1967

3,304,601
APPARATUS FOR PULLING RETAINERS OR
SEALS AND THE LIKE
Henry M. Torres, 5551 Hanbury St.,
Long Beach, Calif. 90808
Filed Aug. 9, 1965, Ser. No. 478,369
3 Claims. (Cl. 29—261)

The present invention relates to apparatus for pulling grease retainers or seals and, more particularly, to a novel seal-pulling apparatus ideally suited to use in removing grease retainers or seals from sockets and from around shafts and the like.

In the past, the removal of grease retainers or seals from sockets and from around shafts has been a very difficult and time-consuming task. In particular, such seals are usually seated within annular recesses and are only accessible from the front. This placement makes for seals very difficult to grasp and remove with conventional tools, even when the seals are seated in open sockets. When the seals are seated in recesses around associated shafts, however, the problems of removal are increased since the shafts interfere with the placement of conventional tools behind and around the seals.

Accordingly, it is an object of the present invention to provide a seal-pulling apparatus which is ideally suited to use in removing grease retainers or seals from sockets and from around associated shafts.

Another object of the present invention is to provide a seal-pulling apparatus which is compact in design and which is long lasting, rapid acting, and reliable in its operation.

A further and more specific object of the present invention is to provide an improved seal-pulling apparatus including a pair of pivotally connected jaws having front ends adapted to fit through and behind a seal seated in an annular recess around a shaft and to then move radially outward and rearward from the shaft to rapidly draw the seal from the recess without damaging the seal.

Still another object of the present invention is to provide a seal-pulling apparatus of the foregoing character having an axially movable rod for bearing against the end of the shaft to draw the seal from the recess and guide means connected to and extending rearward of the pivot for the jaws for guiding the rod against the end of the shaft, whereby the jaws are adapted to receive a very long shaft and the rod is maintained against the shaft during operation of the apparatus.

The foregoing as well as other objects and advantages of the present invention may be more clearly understood by reference to the following detailed description when taken with the drawing which, by way of example only, illustrates one form of seal-pulling apparatus embodying the features of the present invention.

In the drawing:
FIGURE 1 is a perspective view of the seal-pulling apparatus;
FIGURE 2 is a side view of the seal-pulling apparatus;
FIGURE 3 is a sectional view of the seal-pulling apparatus taken along line 3—3 of FIGURE 2; and
FIGURE 4 is a front end view of the seal-pulling apparatus.

Generally speaking, in the drawing, the seal-pulling apparatus is represented by the numeral 10 and includes a pair of identical jaw members 12 and 14. The jaw members are pivotally connected together such that their front ends are movable toward and away from each other to fit within and then move behind a seal 16, represented in phantom outline in FIGURE 1. A threaded rod 18 is carried by a guide 20 and a nut 22 for longitudinal movement between the jaw members 12 and 14. The front end of the rod is adapted to press against the base of the socket housing the seal or, as illustrated in FIGURE 1, the end of a shaft 24. With the ends of the jaw members stationed behind the seal 16 and the end of the rod 18 against the shaft 24, a turning of the rod draws the seal from its annular recess.

More particularly, jaw members 12 and 14 are generally channel-shaped having flat bases 23, 25 and similar triangular side flanges 26, 27 and 28, 29, respectively. The flanges 26 and 27 extend from opposite edges of and normal to the base 23 in line with the flanges 28 and 29 of the jaw member 14.

To pivotally connect the jaw members 12 and 14, the apex of each triangular side flange includes a semi-circular cutout 30. Together, the cutouts 30 in the opposing flanges 26, 28 and 27, 29 are adapted to receive lateral pins 32 extending from the front end of the guide 20. Hinge plates 34 and 36 are connected to the flanges 26 and 27 by screws 42 and extend along the outside of the opposing flanges 26, 28 and 27, 29, respectively. The hinge plates 34 and 36 include central holes 38 for receiving the ends of the pins 32 and arcuate slots 40 facing the associated pins 32 for receiving screws 44 extending from the flanges 28 and 29. Thus, arranged, the jaw members 12 and 14 pivot about the pins 32 between limits defined by the ends of the arcuate slots 40 and the screws 44 to swing their front end portions 46 toward and away from each other to fit within and then move behind and engage the seal 16.

As illustrated, the front end portion 46 of each jaw member projects forward beyond the side flanges thereof and is generally concave to provide a smooth, curved outer surface 48 for supporting the circular inner surface of the seal 16 during removal of the seal. Radial lips 50 extend from the front marginal edges of the end portions 46 and include flat radial rear surfaces 52 and chisel edges 54, defined by rearwardly extending front surfaces 56. The flat rear surfaces 52 engage and press against the flat annular back surface of the seal 16 during its removal while the chisel edges 54 make for easy insertion of the radial lips 50 behind the seal as the front end portions 46 are spread apart.

The separation of the front end portions 46 to engage the seal 16 is under the control of a pair of knobs or nuts 64 and 66 threadedly received by a pair of shafts 58 and 60. In particular, the threaded shafts 58 and 60 extend from opposite sides of the nut 22 and through elliptical holes 62 in rear portions of the bases 23, 25 of the jaw members. The knobs 64 and 66 are received by the jaw members and a turning of the knobs 64 and 66 produces movement of the knobs along the shafts 58 and 60 to engage the outside of the bases. When engaging the bases 23, 25, movement of the knobs toward the nut 22 causes the jaw members 12 and 14 to pivot about the pins 32 and spread apart the lips 50. Thus, by turning the knobs 64 and 66, a workman is able to control the front end portions 46 of the jaw members to first fit within the seal 16 and then to spread apart such that the curved outer surfaces 48 contact with the inner annular surface of the seal and the lips 50 lie behind the seal.

As previously indicated, the nut 22 is adapted to threadedly receive the rod 18. The rod also extends longitudinally through the guide 20 between the jaw members 12 and 14 and preferably has a pointed front tip 19 for abutting against the center of the end of the shaft 24. The rear end of the rod 18 carries an hexagonal head 68 adapted to receive a wrench or other suitable tool for turning the rod to move the pointed tip 19 toward and away from the front end of the jaw members.

The guide 20 is adapted to accurately guide and center the rod 18 between the front end portions 46 and to limit transverse movement of the rod relative to the jaw members. The guide 20 thereby insures that the tip end 19 of the rod 18 will abut the center of the shaft 24 and will not move transversely relative thereto or slip therefrom during operation of the apparatus 10 in pulling the seal 16. This is particularly important where the shaft 24 is threaded and might be scored or otherwise permanently damaged by the tip 19 if it slipped from the end of the shaft during operation. Also, the location of the tip 19 along the axis of the shaft 24 and centrally between the front end portions 46 insures that uniform pulling forces are exerted by the lips 50 on the seal 16 during forward movement of the rod relative to the lips. To this end, the guide 20 includes a sleeve 70 for longitudinally receiving the rod 18 in front of the nut 22. Generally L-shaped arms 72 and 74 extend outwardly from opposite sides of the sleeve 70 and then forward along the rod to the pivot pins 32. The pivot pins 32 extend laterally from the arms 72 and 74 at their front ends.

The positioning of the sleeve 70 to the rear of the pivot pins 32 and adjacent the nut 22 is also very important in that it makes for a compact apparatus 10 which is capable of pulling seals from around long shafts. In particular, if the sleeve guide 70 were forward of the pivot pins and the seal were seated around a long shaft, the jaw members 12 and 14 would have to be quite long in order for the end of the rod 18 to rest within the sleeve 70 and still engage the tip end of the shaft with the lips 50 stationed behind the seal.

By way of review, to remove the seal 16 from around the shaft 24 using the apparatus 10, the knobs 64 and 66 are first turned to move toward the outer ends of the threaded shafts 58 and 60. This allows the jaw members 12 and 14 to be pivoted about the pins 32 to bring the front end portions 46 close together so that the front end portions can be passed through the opening in the seal 16. The knobs 64 and 66 are then turned to move inwardly along the shafts until they engage the bottom of the bases 23 and 25 of the jaw members 12 and 14. Further turning of the knobs 64 and 66 rotates the jaw members 12 and 14 about the pins 32 to swing the lips 50 apart. With such movement, the chisel edges 52 are forced behind the back of the seal 16 and the curved outer surfaces 48 engage the circular inner surface of the seal. Next, the threaded rod 18 is turned to bring the pointed tip 19 of the rod into engagement with the center of the shaft 24. Further turning of the rod then causes the lips 50 to exert pulling forces on the seal 16 to unseat the seal from its annular recess and to pull the seal from around the shaft 24. The apparatus 10 is then removed from the end of the shaft and the knobs 64 and 66 turned to move away from the jaw members. This allows the front end portions 46 to be moved inwardly toward each other and the seal 16 to be released therefrom. The apparatus is then ready to remove another seal by repeating the above operation.

From the foregoing, it is appreciated that the present invention provides a seal-pulling apparatus which is compact in design and rapid acting and reliable in its operation to remove grease retainers or seals from sockets and from around associated shafts.

While a particular form of seal-pulling apparatus has been described in some detail herein, changes and modifications may occur to those skilled in the art without departing from the spirit of the present invention. It is therefore intended that the present invention be limited in scope only by the terms of the following claims.

I claim:

1. Seal-pulling apparatus for drawing a seal from an annular recess around a shaft, comprising:

a pair of opposing jaw members, each jaw member including a longitudinally extending base having a concave longitudinally extending front end portion and a hole in its rear portion, a radial lip projecting from a front marginal edge of said front end portion and having a flat radial rear surface, said lip being adapted to fit into and behind said seal in said recess with said flat radial surface flush with the back of said seal and said concave front portion flush with the inside of said seal, and a pair of side flanges from a midportion of said base extending toward opposing and like flanges of the other jaw member;

pivot means between said opposing flanges for pivotally connecting said jaw members together for movement of said lips toward and away from each other;

a threaded rod;

a first nut for receiving said threaded rod;

first and second threaded shafts extending from opposite sides of said first nut through said holes in the bases of said jaw members and normal to said threaded rod, with said threaded rod extending between said jaw members toward the front ends thereof;

second and third nuts threadedly receiving said first and second shafts, respectively, beyond said jaw members for traveling along said first and second shafts to engage the bases of said jaw members and swing said lips away from each other;

and guide means connected to and extending rearward from said pivot means for loosely receiving said threaded rod and centering said rod between said jaw members such that an end of said rod is adapted to engage the center of said shaft, whereby a turning of said rod to screw same forward, with said flat radial surfaces of said lips behind said seal and said concave front portions of said jaws supporting the inside of said seal, draws said seal from said socket without damaging said seal.

2. Seal-pulling apparatus, comprising:

a pair of identical, opposing jaw members, each jaw member including a longitudinally extending base having a concave longitudinally extending front end portion and a hole in its rear portion, a radial lip projecting from a marginal edge of said front end portion and having a flat radial front surface and a chisel edge, and a pair of side flanges from a midportion of said base extending toward opposing and like flanges of the other jaw member and including aligned semicircular cutouts in the marginal edges thereof;

a threaded rod having a pointed tip;

a first nut for threadedly receiving said threaded rod;

first and second threaded shafts extending from opposite sides of said first nut through said holes in said bases of said jaw members and normal to said threaded rod, with said threaded rod extending between said jaw members and toward said radial lips;

second and third nuts threadedly receiving said first and second shafts, respectively, beyond said jaw members for traveling along said first and second shafts to engage the bases of said jaw members and swing said lips away from each other;

a guide for said threaded rod including a sleeve for receiving said threaded rod in front of said first nut and arms extending from opposite sides of said sleeve forward along opposite sides of said threaded rod;

pins extending from said arms into said cutouts in the edges of said opposing flanges;

a pair of hinge plates along the sides of said opposing flanges and receiving said pins and each including a generally arcuate slot facing the pin received thereby;

means connecting each plate to one of said opposing flanges;

and means extending from the other of said opposing flanges to ride in said arcuate slots.

3. The seal pulling apparatus of claim 1 wherein said guide means comprises a sleeve for receiving said threaded rod immediately in front of said first nut, and arms extending from opposite sides of said sleeve forward along opposing sides of said rod to connect to said pivot means.

References Cited by the Examiner
UNITED STATES PATENTS

| | | | |
|---|---|---|---|
| Re. 15,936 | 10/1924 | Erickson et al. | 29—261 |
| 1,282,079 | 10/1918 | Hawkins | 29—261 |
| 1,343,661 | 6/1920 | Crim et al. | 29—261 |
| 1,534,066 | 4/1925 | Larkey | 29—261 |

FOREIGN PATENTS 52,489    11/1910   Switzerland.

WILLIAM FELDMAN, *Primary Examiner.*

MYRON C. KRUSE, *Examiner.*